3,012,022
TREATMENT OF POLYMERS TO REMOVE CATALYST RESIDUES
Hugh Wilma Boulton Reed and Robert Gilmour Jamieson Telfer, Norton-on-Tees, England, assignors to Imperial Chemical Industries Limited, London, England, a corporation of Great Britain
No Drawing. Filed Apr. 22, 1958, Ser. No. 730,057
Claims priority, application Great Britain May 31, 1957
10 Claims. (Cl. 260—93.7)

This invention relates to the treatment of polymers.

Processes have been described for the polymerisation of unsaturated hydrocarbons to high molecular weight solid polymers in the presence of a metal-containing catalyst. Such a metal-containing catalyst may be formed by reacting a transition metal compound such as, for example, titanium tetrachloride, titanium trichloride or vanadium tetrachloride with an organo-metal compound such as an aluminium alkyl, an alkyl aluminium halide, a complex alkyl of an alkali metal and aluminium, e.g. lithium aluminium tetraethyl or an alkali metal alkyl. These polymerisation processes may be carried out in the presence of an inert solvent such as a hydrocarbon or in the presence of an excess amount of the unsaturated hydrocarbon monomer in the liquid phase and by the term solvent as used hereinafter we include excess or unreacted unsaturated hydrocarbon.

Examples of particularly valuable solid polymers produced by the processes mentioned above are polyethylene and polypropylene especially the so-called isotactic (crystalline) polypropylene.

The crude product of these processes is a solid polymer with occluded metal-containing catalyst residues. The crude product is usually in the form of a slurry in an inert solvent or excess of the unsaturated hydrocarbon. The solvent may contain atactic (amorphous) polymer in solution.

It is very desirable to remove these metal-containing catalyst residues from the polymer, otherwise the polymer may be discoloured and may undergo decomposition particularly when heated.

In previous work, it was found possible to remove metal-containing catalyst residues from solid polymers of unsaturated hydrocarbons by treating the polymer with an amine in the presence of a solvent.

We have now found that this process is considerably facilitated if it is carried out in the presence of an aluminium halide or an aluminium alkyl halide.

According to the present invention, therefore, there is provided a process for removing metal-containing catalyst residues from solid polymers of unsaturated hydrocarbons which comprises treating the polymer with an amine in the presence of a solvent and of an aluminium halide or aluminium alkyl halide, separating the solid polymer from the solvent and recovering solid polymer.

A wide variety of amines which form complexes with metals may be used in the process of the invention. Preferably the amine should be an aliphatic primary amine which is appreciably soluble in the solvent. Examples of suitable amines are octylamines, nonylamines, decylamines, tetradecylamines and octadecylamines. We prefer to use 3,5,5-trimethyl-hexylamine.

The amount of the amine used depends upon the amount of metal-containing catalyst residues in the polymer. Hence the amount of the amine may be varied over a wide range. It is usually sufficient to use less than 120%, particularly between 15% and 75% by weight of amine referred to the weight of polymer insoluble in the solvent. However, if the amount of metal-containing residue is low, less than 15%, for example, 5%, by weight of the amine may be used.

It is preferred that the aluminium halide is soluble in the solvent. Examples of suitable aluminium halides are thus aluminium bromide and aluminium alkyl halides such as ethyl aluminium dichloride and ethyl aluminium sesquichloride. It is preferred to use an aluminium alkyl halide.

Aluminium chloride may be used but since it is only slightly soluble in hydrocarbons it is desirable to use it as a solution in, for example, ether.

Suitable amounts of the aluminium halide or aluminium alkyl halide are up to 12% by weight of the polymer insoluble in the solvent. It is preferred to use between 2.5% and 5% by weight of the insoluble polymer.

It is preferred that the solvent is a hydrocarbon in which the metal-containing residues after treatment with the amine and the aluminium halide are soluble. The hydrocarbon may be an inert hydrocarbon used as a solvent in the polymerisation process or it may be the unsaturated hydrocarbon momomer which has been subjected to the polymerisation process.

Particularly suitable solvents are paraffinic hydrocarbons such as propane, butane, pentane and higher paraffinic hydrocarbons which are in the liquid phase under the conditions of operating the process. The corresponding olefines such as propylene may also be used.

When the polymerisation process has been carried out in the presence of a solvent for example, a saturated hydrocarbon, the amine and the aluminium halide may be added to the mixture of polymer and polymerization solvent. Subsequently the solid polymer is separated from the solvent which may then be recovered for recycle to the polymerisation process.

Alternatively the solid polymer may be separated from the reaction product of the polymerisation process and then slurried in fresh solvent.

The aluminium halide or alkyl aluminium halide should preferably be added to the mixture of polymer and solvent prior to the addition of the amine. The halide may be added as a finely divided suspension or preferably as a solution in the solvent.

It is preferred that the process of the invention is carried out at moderately elevated temperatures, preferably within the range 60° to 80° C.

The process may be carried out under elevated pressures particularly when it is desired to use a solvent which is normally gaseous at the temperature at which the process is operated.

After treatment with the amine and aluminium halide the solid polymer is separated for example, by filtration, from the liquid components of the mixture and washed with a hydrocarbon which is preferably the hydrocarbon used as a solvent and very suitably a low boiling hydrocarbon such as propane or propylene.

The solid polymer may finally be steamed to remove the last traces of solvent.

Contact of the products of the polymerisation process with air and moisture should preferably be prevented until the treatment with the amine and subsequent separation of the polymer and solvent has been completed. The use of an amine having anti-oxidant properties, in an amount such that residual amine remains in the polymer is of advantage in ensuring that no deterioration of the polymer due to oxidation processes occurs subsequently particularly during fabrication processes involving melting the polymer.

The process of the invention is applicable to the removal of metal-containing catalyst residues from polymers of unsaturated hydrocarbons such as polyethylene and polypropylene produced in the presence of a catalyst formed by reacting a titanium compound such as titanium tetrachloride or titanium trichloride with an organo-compound of aluminium, e.g. an aluminium alkyl.

Example 1

1 gram aluminium trichloride in 10 ml. diethyl ether was added to 200 ml. of a suspension of polypropylene in petroleum ether containing 15% w./v. suspended polymer. The polymer was obtained by polymerising propylene in the presence of the reaction product of titanium trichloride and aluminium triethyl. The suspension had been stored for some time and the original lilac colour of the freshly made suspension had partly discharged presumably due to contact with a limited amount of air. The crude polymer contained about 1.0% ash.

The suspension was now heated at 75° C. for 30 minutes, 35 ml. 3,3,5-trimethylhexylamine added and the temperature maintained at 75° C. for a further hour. The lilac colour of the suspension became grey-white. The suspension was filtered under nitrogen and washed with 1 litre petroleum ether (boiling range 60° to 80° C.), under reflux conditions. White polypropylene was obtained which had an ash content of 0.14% and which melted to give an almost colourless melt.

Example 2

3 grams methyl aluminium sesquichloride were added to 200 ml. of a slurry of polypropylene in petroleum ether (boiling range 60°–80° C.) containing 25 grams suspended polypropylene. The crude polymer contained about 1.0% ash.

The slurry was then heated at 70° C. for 1 hour and 30 ml. 3,5,5-trimethylhexylamine added. The original lilac colour of the slurry was discharged. Heating at 70° C. was continued for a further 10 minutes. The polymer was then filtered off and washed twice with 500 ml. petroleum ether at 70° C.

The final ash content of the polymer was 0.16% and the polymer melted to give a pale yellow melt.

We claim:

1. In a process for removing catalyst residues from solid polymers prepared by polymerizing a member of the group consisting of ethylene and propylene in the presence of a catalyst prepared by interacting a member of the group consisting of titanium tetrachloride and titanium trichloride with a member of the group consisting of aluminum alkyl and alkyl aluminum halides; the improvement comprising adding to a slurry of said polymer in a solvent selected from a group consisting of hydrocarbons and hydrocarbons mixed with ether, about 2.5–5% by weight of the polymer of a metal halide selected from the group consisting of aluminum chloride, aluminum bromide and aluminum lower alkyl chlorides, adding a primary aliphatic amine having 8–18 carbon atoms, heating to about 60–80° C. and separating said solid polymer from said solvent.

2. A process as claimed in claim 1 in which the hydrocarbon is a paraffinic hydrocarbon.

3. A process as claimed in claim 1 in which the hydrocarbon is the unsaturated hydrocarbon monomer used in the polymerization process.

4. A process as claimed in claim 1 in which the solid polymer after separation from the hydrocarbon solution is washed with a hydrocarbon.

5. A process as claimed in claim 1 in which the amine is 3,5,5-trimethylhexylamine.

6. A process as claimed in claim 1 in which the amine is used in an amount less than 120% preferably between 15% and 75%, by weight of the polymer insoluble in the solvent.

7. A process as claimed in claim 1 in which said metal halide compound is soluble in the solvent.

8. A process as claimed in claim 1 in which the polymer is finally treated with steam.

9. A process as claimed in claim 1 in which the solid polymer is polyethylene.

10. A process as claimed in claim 1 in which the solid polymer is polypropylene.

References Cited in the file of this patent

UNITED STATES PATENTS

| | | |
|---|---|---|
| 2,899,416 | Schreyer | Aug. 11, 1959 |
| 2,908,675 | Lindland | Oct. 13, 1959 |